(12) United States Patent
Jiao et al.

(10) Patent No.: US 11,707,773 B2
(45) Date of Patent: Jul. 25, 2023

(54) METHOD FOR MANUFACTURING CLAD STEEL PIPE

(71) Applicant: BAOSHAN IRON & STEEL CO., LTD., Shanghai (CN)

(72) Inventors: Sihai Jiao, Shanghai (CN); Bo Yan, Shanghai (CN); Cheng Zhou, Shanghai (CN)

(73) Assignee: BAOSHAN IRON & STEEL CO., LTD., Shanghai (CN)

(*) Notice: Subject to any disclaimer, the term of this patent is extended or adjusted under 35 U.S.C. 154(b) by 750 days.

(21) Appl. No.: 16/493,718

(22) PCT Filed: Jan. 31, 2018

(86) PCT No.: PCT/CN2018/074674
§ 371 (c)(1),
(2) Date: Sep. 12, 2019

(87) PCT Pub. No.: WO2018/177020
PCT Pub. Date: Oct. 4, 2018

(65) Prior Publication Data
US 2020/0001339 A1    Jan. 2, 2020

(30) Foreign Application Priority Data
Mar. 27, 2017  (CN) .......................... 201710188759.0

(51) Int. Cl.
*B21C 37/08* (2006.01)
*B21B 1/38* (2006.01)
(Continued)

(52) U.S. Cl.
CPC ................ *B21C 37/08* (2013.01); *B21B 1/38* (2013.01); *B21C 37/065* (2013.01); *B21C 37/30* (2013.01);
(Continued)

(58) Field of Classification Search
CPC . B21C 37/08; B21C 37/0822; B21C 37/0826; B21C 37/09; B21C 37/14;
(Continued)

(56) References Cited

U.S. PATENT DOCUMENTS

| | | | | |
|---|---|---|---|---|
| 1,316,384 A | * | 9/1919 | Murray ................ | B23K 13/046 219/67 |
| 1,712,090 A | * | 5/1929 | Murphy ................. | B21C 37/09 138/143 |

(Continued)

FOREIGN PATENT DOCUMENTS

| | | |
|---|---|---|
| CN | 103317306 B | 9/2013 |
| CN | 103753030 A | 4/2014 |

(Continued)

OTHER PUBLICATIONS

JP 62-148021A, Hashimoto et al., Jul. 1987.*

(Continued)

*Primary Examiner* — Edward T Tolan
(74) *Attorney, Agent, or Firm* — Procopio, Cory, Hargreaves & Savitch LLP

(57) ABSTRACT

A method for manufacturing a clad steel pipe is provided, wherein the clad steel pipe is manufactured by using a clad steel plate as a raw material. The clad steel plate comprises a base layer (1) and a clad layer (2) roll-bonded with the base layer (1). The method for manufacturing a clad steel pipe comprises the steps of forming, welding, and deburring; both sides of the clad steel plate are bent towards the base layer (1) side of the clad steel plate, then the forming step is carried out, and after the forming step, the opening faces of the resultant pipe blank are all in a form of the clad layer (2). According to the method for manufacturing a clad steel pipe, a clad steel pipe is manufactured by using a clad steel plate as a raw material. Thus, continuance and high efficiency of a high-frequency longitudinal welding pipe unit is fully (Continued)

utilized, subsequent non-continuous processes are not necessary, and the corrosion resistance at the weld of the clad steel pipe is ensured.

7 Claims, 3 Drawing Sheets

(51) Int. Cl.
*B21C 37/06* (2006.01)
*B21C 37/30* (2006.01)
*B23K 13/02* (2006.01)
*B23K 31/02* (2006.01)

(52) U.S. Cl.
CPC .......... *B23K 13/025* (2013.01); *B23K 31/027* (2013.01); *B21B 2001/383* (2013.01)

(58) Field of Classification Search
CPC ... B21C 37/154; B21C 37/065; B21C 37/286; B23K 13/025; B23K 11/16; B23K 31/027; B23K 2101/06; B23K 13/046; B21D 5/10; B21D 5/12
See application file for complete search history.

(56) References Cited

U.S. PATENT DOCUMENTS

| | | | | | |
|---|---|---|---|---|---|
| 1,944,096 | A | * | 1/1934 | Mayweg | B23K 11/062 219/67 |
| 2,691,815 | A | * | 10/1954 | Boessenkool | B23K 20/04 313/355 |
| 2,753,623 | A | * | 7/1956 | Boessenkool | B22F 7/06 228/205 |
| 3,327,383 | A | * | 6/1967 | Reed | B21C 37/09 138/152 |
| 3,350,771 | A | * | 11/1967 | Durst | B21C 37/09 228/151 |
| 3,610,290 | A | * | 10/1971 | Anderson | F16L 9/04 428/592 |
| 3,775,840 | A | * | 12/1973 | Diepers | B21C 37/09 505/925 |
| 5,344,062 | A | * | 9/1994 | Krengel | B21C 37/08 228/231 |
| 5,704,537 | A | * | 1/1998 | Friedrich | B21C 37/0822 228/148 |
| 7,569,766 | B2 | * | 8/2009 | Moe | H01B 13/2686 174/109 |
| 7,687,719 | B2 | * | 3/2010 | Moe | B23K 9/0253 174/106 R |
| 9,799,931 | B2 | * | 10/2017 | Hamada | H01M 10/6563 |
| 2015/0102988 | A1 | * | 4/2015 | Suzuki | G09G 3/3614 345/92 |
| 2019/0061044 | A1 | * | 2/2019 | Jeong | B23K 9/232 |
| 2019/0184437 | A1 | * | 6/2019 | Okabe | C22C 19/057 |
| 2019/0219218 | A1 | * | 7/2019 | Ide | C22C 38/04 |

FOREIGN PATENT DOCUMENTS

| | | |
|---|---|---|
| CN | 103978299 A | 8/2014 |
| CN | 104858536 A | 8/2015 |
| DE | 202013010598 U1 | 4/2015 |
| JP | S49037624 B | 10/1974 |
| JP | S62244585 A | 10/1987 |
| JP | 2000288626 A | 10/2020 |
| KR | 1020100125559 A | 12/2010 |

OTHER PUBLICATIONS

Examination Report for related AU App No. 2018246660 dated May 14, 2020, 4 pgs.
Extended European Search Report for related EP App No. 18777638.0 dated Mar. 10, 2021, 27 pgs.
Notice of Reasons for Refusal for related JP App No. 2019-548000 dated Sep. 15, 2020, 9 pgs.
Office Action for related KR App No. 10-2019-7027873 dated Mar. 2, 2021, 8 pgs.
First Office Action for related CN App No. 201710188759.0, 12 pgs.
Second Office Action for related CN App No. 201710188759.0, 10 pgs.
Third Office Action for related CN App No. 201710188759.0, 9 pgs.
International Search Report for related International Application No. PCT/CN2018/074674 dated Apr. 10, 2018; 2 pages.

* cited by examiner

METHOD FOR MANUFACTURING CLAD STEEL PIPE

CROSS-REFERENCE TO RELATED APPLICATIONS

This application is a U.S. National Stage entry of PCT Application No: PCT/CN2018/074674 filed Jan. 31, 2018, which claims priority to Chinese Patent Application No. 201710188759.0, filed Mar. 27, 2017, the contents of which are incorporated herein by reference.

TECHNICAL FIELD

The present invention relates to a method for manufacturing a steel material, and more particularly to a method for manufacturing a steel pipe.

BACKGROUND ART

The clad steel pipe has both the mechanical properties of the base steel and the corrosion resistance of the clad metal. Clad steel pipes are used more and more widely because they are cost-effective for use in the transport of corrosive fluids or mechanical structures in corrosive environments.

Based on the binding state of the clad metal and the base metal, the clad steel pipe can be divided into two types: mechanically-bonded clad steel pipes and metallurgical-bonded clad steel pipes. The former has local gaps and a low bonding strength, and interface separation may occur during use. In contrast, the latter has excellent overall performance.

On the one hand, the conventional production technology of steel pipes has been used for the production of clad steel pipes. The conventional production technology of steel pipes includes seamless steel pipe production technology and welded pipe production technology. The former includes hot-rolling of seamless steel pipes and hot-extrusion of seamless steel pipes. The latter includes production techniques for longitudinal welding pipes, spiral welded pipes and high-frequency longitudinal welding pipes. Compared with the production technology of seamless steel pipes, the production technology of welded pipe, especially high-frequency longitudinal welding pipes, uses a steel plate as a raw material, which has uniform wall thickness, regular geometrical size and low production cost.

On the other hand, the roll-bonded clad steel plate has a good metallurgical bonding effect, high bonding strength between the clad layer and the base steel plate, high dimensional precision and good surface quality. Therefore, it is desirable to produce the clad steel pipe by the high-frequency longitudinal welding pipe technology using the roll-bonded clad steel plate as a raw material.

When a clad steel pipe is produced by a high-frequency longitudinal welding pipe unit using a clad steel plate as a raw material, since the clad layer metal is thin, the clad layer metal at the weld is extruded and becomes a part of the burr. After the deburring, the clad layer metal at the weld is thinned or scraped off, resulting in a reduced corrosion resistance at the weld.

Chinese patent document titled "Process for production of double-metal metallurgical clad tube through high-frequency resistance welding method and clad tube" (Publication No. CN103978299A, Publication date: Aug. 13, 2014) disclosed a process for production of double-metal metallurgical clad tube through high-frequency resistance welding method and a clad tube. The technical solution disclosed in the patent document uses a high-frequency resistance welding method to produce a double-metal metallurgical clad tube. A metallurgical clad steel tube with an inner corrosion-resistant alloy lining and an outer base tube is produced using a clad steel plate as a raw material by a high-frequency resistance welding method. The lining near the weld is scraped off, and then repair-welded to achieve continuity of the inner corrosion-resistant alloy lining. However, the technical solution also requires the off-line repair welding process after the high-frequency resistance welding.

It is desirable to obtain a method for manufacturing a clad steel pipe which can fully utilize the continuous and high-efficiency characteristics of the high-frequency longitudinal welding pipe unit without the need for subsequent non-continuous processes, while ensuring the corrosion resistance at the weld of the clad steel pipe.

SUMMARY OF THE INVENTION

One object of the present invention is to provide a method for manufacturing a clad steel pipe which can fully utilize the continuous and high-efficiency characteristics of the high-frequency longitudinal welding pipe unit without the need for subsequent non-continuous processes, while ensuring the corrosion resistance at the weld of the clad steel pipe.

In order to achieve the above object, the present invention provides a method for manufacturing a clad steel pipe, wherein the clad steel pipe is manufactured by using a clad steel plate as a raw material; the clad steel plate comprises a base layer and a clad layer roll-bonded with the base layer; the method for manufacturing a clad steel pipe comprises the steps of forming, welding, and deburring; wherein both sides of the clad steel plate are bent towards the base layer side of the clad steel plate, then the forming step is carried out, and after the forming step, the opening faces of the resultant pipe blank are all in a form of the clad layer.

In the manufacturing method according to the present invention, a pipe blank is obtained by bending both sides of the clad steel plate towards the base layer side of the clad steel plate and then performing the forming step. The original opening faces of the pipe blank are the base layer and the clad layer roll-bonded with the base layer. After the forming step, due to the bending, the opening faces of the resultant pipe blank are all in a form of the clad layer, which is easy to weld. Moreover, since the bending height is higher than the thickness of the clad steel plate, no additional off-line repair welding process is required after welding. During welding, the clad layer metal is extruded to form burrs. After deburring, the integrity of the clad layer metal is still maintained at the weld, ensuring the corrosion resistance of the clad steel pipe. At the same time, the mechanical properties of the weld are guaranteed due to the sufficient weld area. In other words, the present invention improves the conventional high-frequency longitudinal welding pipe process to achieve the production of a clad steel pipe without the need for an additional subsequent process. Therefore, compared with the prior art, the manufacturing method of the present invention is more simple while ensuring the corrosion resistance at the weld of the clad steel pipe.

Further, in the method for manufacturing a clad steel pipe according to the present invention, both sides of the clad steel plate are bent in an angle θ of 75° to 95°. In the technical solution of the present invention, when the angle θ is less than 75°, the amount of bending deformation increases, the process difficulty is improved, and the efficiency is lowered. When the angle θ is greater than 95°, the ends of the bent portion are brought into contact before welding, which reduces the stability of the welding.

Further, in the method for manufacturing a clad steel pipe according to the present invention, the height H of the portion bent as above is 1 to 2 times the thickness of the clad steel plate.

Further, in the method for manufacturing a clad steel pipe according to the present invention, after the forming step, the clad layer is on an outer surface side of the pipe blank.

Further, in the method for manufacturing a clad steel pipe according to the present invention, after the forming step, the clad layer is on an inner surface side of the pipe blank.

Further, in the method for manufacturing a clad steel pipe according to the present invention, the metal material forming the base layer is carbon steel or alloy steel.

Further, in the method for manufacturing a clad steel pipe according to the present invention, the metal material forming the clad layer is stainless steel or copper alloy.

In the method for manufacturing a clad steel pipe of the present invention, the clad steel pipe is manufactured by using a clad steel plate as a raw material. The manufacturing method fully utilizes the continuous and high-efficiency characteristics of the high-frequency longitudinal welding pipe unit without the need for subsequent non-continuous processes, while ensuring the corrosion resistance at the weld of the clad steel pipe.

DETAILED DESCRIPTION

The method for manufacturing a clad steel pipe of the present invention will be further explained and illustrated below with reference to the accompanying drawings and specific Examples. However, the explanations and illustrations do not unduly limit the technical solutions of the present invention.

Figure 1:
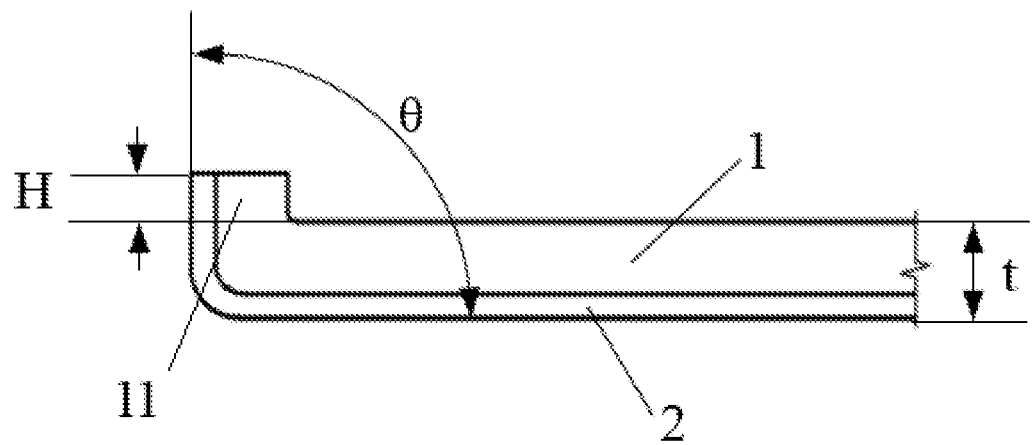
FIG. 1 shows a partial structure of a cross section when a clad steel plate according to the manufacturing method of the present invention is bent.

FIG. 1 shows a partial structure of a cross section when a clad steel sheet according to the manufacturing method of the present invention is bent.

As shown in FIG. 1, the clad steel plate comprises a base layer 1 and a clad layer 2 roll-bonded with the base layer 1, and a bent portion 11 is formed by bending both sides of the clad steel plate towards the base layer side of the clad steel plate. Then, a forming step is carried out to form a pipe blank. As can be seen from FIG. 1, the opening faces of the bent portion 11 are the clad layer 2, that is, the opening faces of the pipe blank are the clad layer 2. Then, the bent portion 11 is subjected to welding and deburring to obtain the desired clad steel pipe.

As shown in FIG. 1, θ represents the bending angle, H represents the height of the bent portion 11, and t represents the thickness of the clad steel plate.

Figure 2:
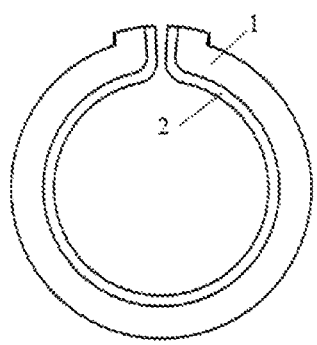
FIG. 2 is a schematic view showing a cross section of the clad steel pipe of Example 1 in the forming process.

FIG. 2 is a schematic view showing a cross section of the clad steel pipe of Example 1 in the forming process. As shown in FIG. 2, the clad steel plate used in the clad steel pipe of Example 1 comprises a base layer 1 and a clad layer 2 roll-bonded with the base layer 1, and a bent portion is formed by bending two sides of the clad steel plate towards the base layer side of the clad steel plate. The height of the bent portion is the same as the height of the clad steel plate. The clad layer 2 of the pipe blank after forming is on the inner surface side of the pipe blank. The metal material of the base layer is carbon steel, and the metal material of the clad layer is stainless steel. In other embodiments, the metal material of the base layer is carbon steel or alloy steel, and the metal material of the clad layer is stainless steel or copper alloy.

Figure 3:
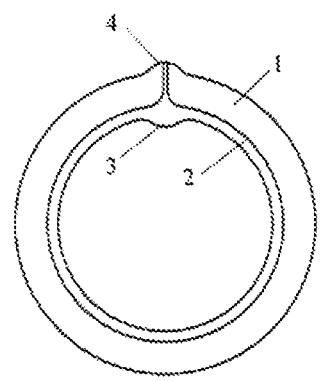
FIG. 3 is a schematic view showing a cross section of the clad steel pipe of Example 1 in the welding process.
Figure 4:
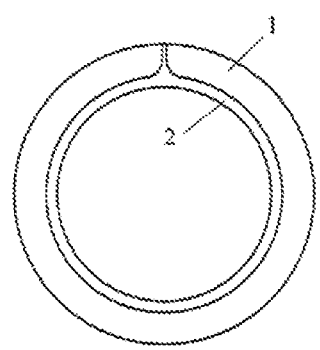
FIG. 4 is a schematic view showing a cross section of the clad steel pipe of Example 1 after the deburring process.

Subsequently, the pipe blank is subjected to high frequency heating and welding. FIG. 3 is a schematic view showing a cross section of the clad steel pipe of Example 1 in the welding process. As shown in FIG. 3, during the welding, outer burrs 4 projecting in the radial direction away from the center of the circle and inner burrs 3 projecting in the radial direction toward the center of the circle are formed. The clad steel pipe after deburring is shown in FIG. 4. FIG. 4 is a schematic view showing a cross section of the clad steel pipe of Example 1 after the deburring process. After deburring, the clad steel pipe is subjected to conventional processes such as heat treatment, sizing and inspection to obtain a desired metallurgical-bonded clad steel pipe with a stainless steel lining.

Figure 5:
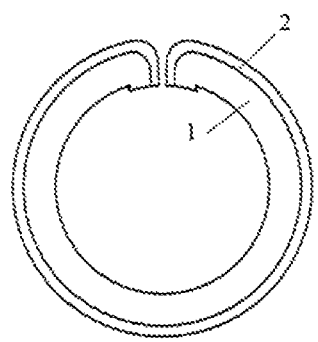
FIG. 5 is a schematic view showing a cross section of the clad steel pipe of Example 2 in the forming process.

FIG. 5 is a schematic view showing a cross section of the clad steel pipe of Example 2 in the forming process. As shown in FIG. 5, the clad steel plate used in the clad steel pipe of Example 2 comprises a base layer 1 and a clad layer 2 roll-bonded with the base layer 1, and a bent portion is formed by bending two sides of the clad steel plate towards the base layer side of the clad steel plate. The height of the bent portion is the same as the height of the clad steel plate. The clad layer 2 of the pipe blank after forming is on the outer surface side of the pipe blank.

Figure 6:
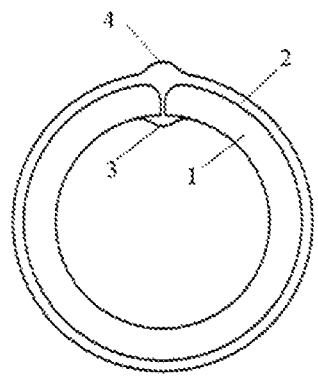
FIG. 6 is a schematic view showing a cross section of the clad steel pipe of Example 2 in the welding process.
Figure 7:
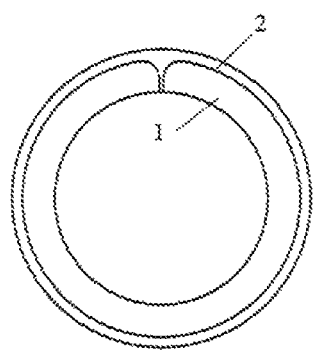
FIG. 7 is a schematic view showing a cross section of the clad steel pipe of Example 2 after the deburring process.

Subsequently, the pipe blank is subjected to high frequency heating and welding. FIG. 6 is a schematic view showing a cross section of the clad steel pipe of Example 2 in the welding process. As shown in FIG. 6, during the welding, outer burrs 4 projecting in the radial direction away from the center of the circle and inner burrs 3 projecting in the radial direction toward the center of the circle are formed. The clad steel pipe after deburring is shown in FIG. 7. FIG. 7 is a schematic view showing a cross section of the clad steel pipe of Example 2 after the deburring process. After deburring, the clad steel pipe is subjected to conventional processes such as heat treatment, sizing and inspection to obtain a desired metallurgical-bonded clad steel pipe coated with stainless steel.

It can be seen from Examples 1 and 2 that the clad layer of the clad steel pipe obtained by the manufacturing method of the present invention can be located either on the inner surface of the clad steel pipe or on the outer surface of the clad steel pipe. The manufacturing method of the present invention is flexible and simple. The manufacturing method fully utilizes the continuous and high-efficiency characteristics of the high-frequency longitudinal welding pipe unit without the need for subsequent non-continuous processes, while ensuring the corrosion resistance at the weld of the clad steel pipe.

It should be noted that the above are merely illustrative of specific Examples of the invention. It is obvious that the present invention is not limited to the above Examples, but has many similar variations. Various modifications that are directly derived or conceived by those skilled in the art from this disclosure are intended to be within the scope of the present invention.

The invention claimed is:

1. A method for manufacturing a clad steel pipe using a clad steel plate as a raw material, the method comprising:
   providing the clad steel plate having a base layer and a clad layer roll-bonded to the base layer;
   a first bending of both longitudinal sides of the clad steel plate towards a side of the base layer of the clad steel plate at an angle to form bent portions of the base layer and the clad layer on both ends of the clad steel plate;
   forming a pipe blank by a second bending of the ends of the clad steel plate having the bent portions, such that, after the forming, an entirety of opening faces of the pipe blank includes the clad layer;
   welding the pipe blank formed after the forming; and
   deburring the pipe blank welded after the welding.

2. The method for manufacturing a clad steel pipe as claimed in claim 1, wherein the each of the longitudinal sides of the clad steel plate are bent in the angle of 75° to 95°.

3. The method for manufacturing a clad steel pipe as claimed in claim 1, wherein a height of the bent portions at said each of the longitudinal sides of the clad steel plate is 1 to 2 times a thickness of the clad steel plate.

4. The method for manufacturing a clad steel pipe as claimed in claim 1, wherein, after the forming, the clad layer is on an outer surface side of the pipe blank.

5. The method for manufacturing a clad steel pipe as claimed in claim 1, wherein, after the forming, the clad layer is on an inner surface side of the pipe blank.

6. The method for manufacturing a clad steel pipe as claimed in claim 1, wherein a metal material forming the base layer is a carbon steel or an alloy steel.

7. The method for manufacturing a clad steel pipe as claimed in claim 1, wherein a metal material forming the clad layer is a stainless steel or a copper alloy.

* * * * *